UNITED STATES PATENT OFFICE 1,920,583

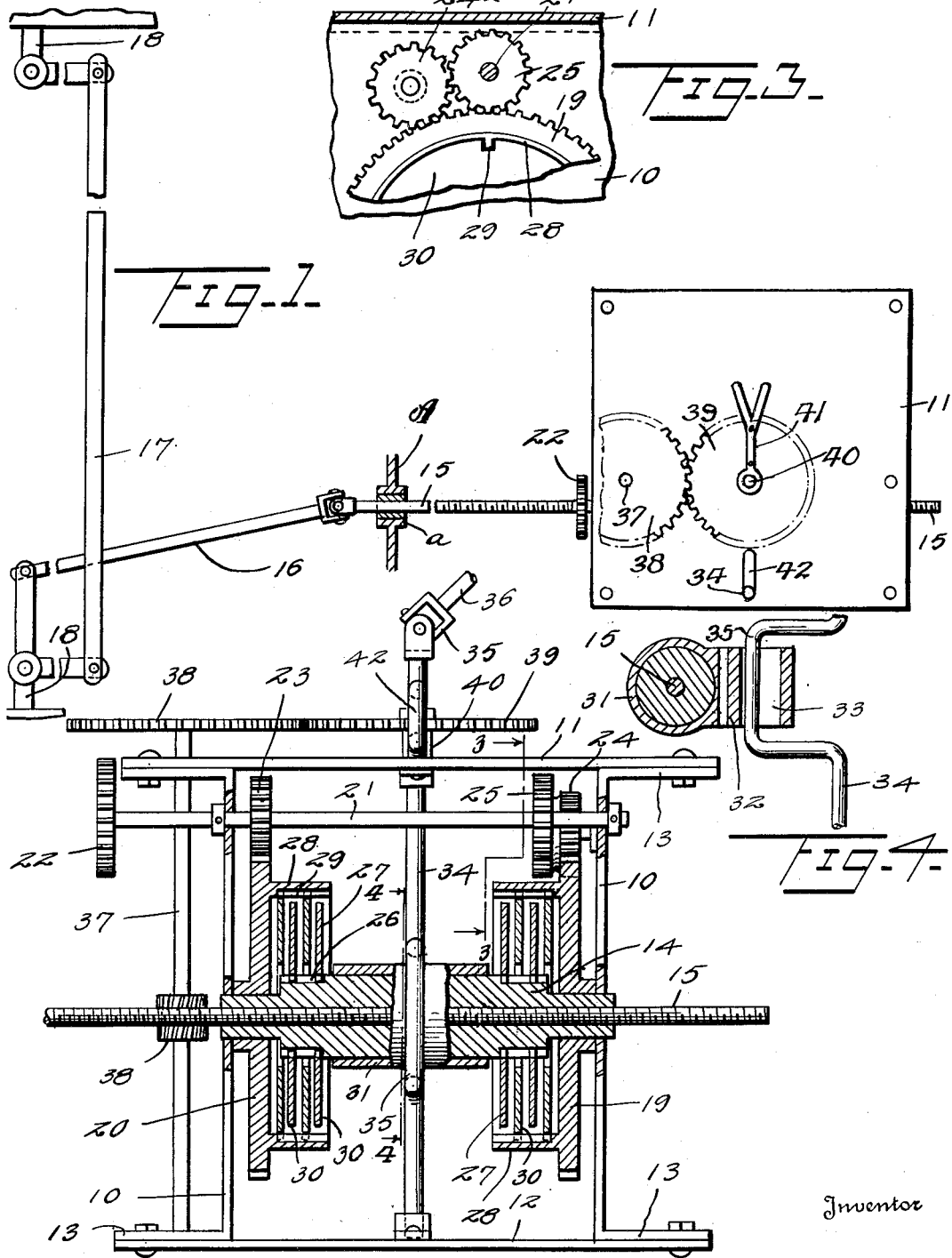

MOTOR CONTROLLED STEERING MECHANISM

John O'Hare, Chicago, Ill.

Application September 3, 1932
Serial No. 631,732

7 Claims. (Cl. 180—79.3)

This invention relates to steering mechanism for automobiles and particularly to motor-operated mechanism for this purpose. The general object of the invention is to provide a relatively simple, light and easily controlled mechanism by which the power of the motor may be used for the purpose of steering the vehicle and to provide means for automatically stopping the power operated mechanism when the steering wheels have reached the limit of their proper movement.

A further object is to provide a mechanism of this character which includes a constantly driven power shaft operatively connected to the motor, a screw shaft, an internally screw-threaded member constituting the rotatable nut and mounted upon the screw shaft with manually controllable clutches adapted, when shifted, to drive the rotatable interiorly threaded member in one of the two directions to thus shift the screw shaft in either one of two directions, the screw shaft being operatively connected to the steering wheels of the vehicle.

Other objects will appear in the course of the following description.

My invention is illustrated in the accompanying drawing, wherein:—

Figure 1 is a top plan view of my mechanism showing the connections to one steering wheel of the vehicle;

Figure 2 is a vertical sectional view through my mechanism;

Figure 3 is a section on the line 3—3 of Figure 2 and Figure 4 is a section on the line 4—4 of Figure 2.

Referring more particularly to Figure 2, it will be seen that I have illustrated a supporting frame including the vertical members 10 and the horizontal members 11 and 12, the members 10 being flanged at 13 for attachment by bolts to the plates or members 11 and 12. Mounted in suitable bearings within the members 10 are the reduced ends of a tubular shaft 14 which is interiorly screw-threaded and which coacts with a screw-threaded rod 15. This rod moves transversely with reference to the frame and at its end is operatively connected as, for instance, through the medium of the connecting rod 16 to one of the stub axles 18 of the vehicle wheels. Thus it will be seen that as the rod 15 is shifted in one direction, the wheels will likewise be shifted. As before stated, the tubular shaft 14 is reduced at its ends and mounted upon these reduced ends are the gear wheels 19 and 20. These gear wheels 19 and 20 rotate freely around the tubular shaft. Extending parallel to the screw-threaded rod 15 and hence to the axis of the tubular shaft 14 is a counter-shaft 21 which is mounted in the frame and which at one end carries the rear wheel 22. This wheel 22 is purely illustrative of any suitable means which may be used for transmitting power from the engine to the wheel 21 and this wheel may be toothed or it may be a sprocket wheel or any other suitable mechanism for transmitting power to this shaft 21.

Mounted upon the shaft 21 and engaging the gear wheel 20 is a pinion 23 which meshes directly with the gear wheel 20. The gear wheel 19 meshes with an intermediate or idler gear wheel 24 which in turn is driven by a gear wheel 24a and a gear wheel 25 mounted upon the shaft 21. Thus the gear wheel 19 may be rotated in the reverse direction to the gear wheel 20, though the shaft 21 is rotated at all times in the same direction.

For the purpose of operatively connecting the shaft 14 with either of the gear wheels 19 or 20, I provide manually controlled clutches whereby to clutch either of these gear wheels 19 or 20 to the shaft 14. I have illustrated friction clutches for this purpose and have illustrated the extremities of the shaft 14 as being formed with grooves 26 to receive lugs on the usual friction clutch plates 27 which, therefore, rotate with the shaft 14 and have illustrated each of the gear wheels 19 and 20 as being provided with the outwardly projecting annular flanges 28 having grooves 29 within which outwardly projecting lugs on the clutch plates 30 engage. Thus it will be seen that if the clutch disks on one side be compressed, the shaft 14 will be driven in one direction and it will be driven in the other direction if the clutch disks on the other end of the shaft are compressed.

For the purpose of operating the clutches, I provide a sliding sleeve 31 which is shiftable upon the shaft 14 and is, of course, held from any rotary movement with relation to this shaft, this sleeve acting when shifted in one direction to effect the clutching action at one end of the shaft and when shifted in the other direction acting to effect a clutching action at the other end of the shaft. For the purpose of shifting this sleeve, I have shown the sleeve as outwardly extended at 32 and formed with a slot 33.

An oscillatable control post 34 is provided which is formed with a cranked portion 35 which extends through the slot 33. This control post is mounted at its lower end in the upper plate 11 in any suitable manner and at its upper end is connected to any suitable manually operated controlling means. I have shown, however, the upper end of this post as being connected by a universal joint 35 with a control shaft 36 which extends to the driver's seat or may extend through the fixed steering post of the vehicle and be provided with any suitable controlling wheel. By this means, it will be seen that when the driver turns the control shaft in one direction, the clutches on that side will be thrown in gradually and the motor will immediately operate to shift the screw-threaded rod 15 transversely in one direction or the other to thus effect the steering movement of the vehicle wheels and that as the shaft 36 is returned toward its normal position, the clutches will gradually release and as the opposite clutches are applied, the rod 15 will return to its normal position.

In order to prevent too great a movement of the steering shaft which would act to turn the vehicle in too short a circle, I have provided stop mechanism as follows:—

Extending vertically at one side or the other of the frame is a vertical shaft 37 carrying upon it a pinion 38 having inclined teeth adapted to mesh with the screw-threads on the rod 15. These threads thus act as rack teeth so that when the rod 15 is shifted in one or the other directions, the shaft 37 will be turned in one direction or the other. Mounted upon the upper end of this shaft 37 is a gear wheel 38 meshing with a gear wheel 39 mounted in any suitable manner upon the plate 11, as for instance, upon the upstanding bearing 40. This wheel carries upon it the outstanding arm 41.

The upper end of the shaft 34 is likewise provided with an outstanding arm shown as a crank arm and designated 42. This crank embraces the gear wheel 39. As the shaft or steering post 34 is turned in one direction or the other, it will, as before stated, operate the clutches. These clutches would continue to operate to turn the steering wheels until the steering wheels turned too far or until something broke were it not for the stop 41. As the rod 15 is shifted, however, it acts through the shaft 37 and the wheel 38 to rotate the wheel 39 and thus rotate the stop arm 41. This rotation continues until the stop arm strikes the crank 42 whereupon the continued rotation of the stop arm 41 acts to automatically shift the steering shaft back toward its normal position and release the clutch.

It will be noted that the stop arm 41 is Y-shaped in plan or, in other words, that its outer end has divergent edges. The reason for this is that the gear 39 which carries this stop arm makes less than one turn for the full movement of the rod 15. It is intended to make this arm of such width at its outer end that the side edges of the arms will release either of the clutches when the end of the motion is reached. By varying the distance between the side edges of the outer portion of the stop arm, the mechanism can be correctly timed to stop the arm 42 at any desired point less than a complete rotation of this arm and return this arm 42 to its neutral position. It will be seen that it is the length of the steering arm on the front wheel between centers that govern the length of motion of the rod 15 and it is the relative size of gears 38 and 39 plus the width of the outer end of the stop arm 41 that fixes the position where either clutch will be released. The machine is designed to be fitted within a case and such case is designated as A in the drawing and is provided with a bearing $a$ through which the rod 15 passes, this bearing supporting the rod against any sidewise thrust. This bearing should be oil tight and water tight and so constructed as to take the side thrust and prevent the rod 15 from binding.

My structure is particularly light and compact, it may be readily connected up to the motor of the vehicle by any one of a number of different and obvious connections, and provides for a ready control of the steering mechanism while at the same time preventing any overrunning or overmovement of the steering mechanism.

While I have illustrated a certain specific embodiment of my invention, I do not wish to be limited to this embodiment as many changes might be made without departing from the spirit of the invention as defined in the appended claims.

I claim:—

1. A motor operated steering mechanism including tubular internally threaded shaft, a screw-threaded rod disposed within said shaft and shifted by the shaft in one direction or the other as the shaft is rotated in one direction or the other, clutch elements mounted upon the opposite ends of said shaft, gear wheels loosely mounted upon the opposite ends of the shaft, clutch elements carried by the gear wheels and coacting with the first named clutch elements, motor operated means for driving said gear wheels in relatively opposite directions, and manually operated means for clutching either one of said gear wheels to the rotatable shaft.

2. A motor operated steering mechanism including a tubular internally threaded shaft, a screw-threaded rod disposed within said shaft and shifted by the shaft in one direction or the other as the shaft is rotated in one direction or the other, clutch elements mounted upon the opposite ends of said shaft, gear wheels loosely mounted upon the opposite ends of the shaft, clutch elements carried by the gear wheels and coacting with the first named clutch elements, motor opperated means for driving said gear wheels in relatively opposite directions, and manually operated means for clutching either one of said gear wheels to the rotatable shaft including a sleeve slidingly mounted upon the rotatable shaft, and a manually operable shaft having an arm engaging said sleeve.

3. A motor operated steering mechanism including a supporting frame, a tubular interiorly screw-threaded shaft mounted within the frame, a threaded rod engaged by the threads on said shaft, the rotation of the shaft in one direction or the other causing a movement of the rod in one direction or the other, steering mechanism operatively connected to the rod to be shifted thereby, gear wheels loosely mounted upon opposite ends of the shaft, motor operated means for rotating said gear wheels in relatively opposite directions, clutches comprising coacting elements mounted upon the gear wheels and the shafts respectively, manually operable means for shifting said clutches in one direction or the other, and automatically operating means acting to unclutch either one of said gear wheels from the shaft when the shaft has made a predetermined rotation in one direction.

4. A motor operated steering mechanism including a supporting frame, a tubular interiorly screw-threaded shaft mounted within the frame, a threaded rod engaged by the threads on said shaft, the rotation of the shaft in one direction or the other causing a movement of the rod in one direction or the other, steering mechanism operatively connected to the rod to be shifted thereby, gear wheels loosely mounted upon opposite ends of the shaft, motor operated means for rotating said gear wheels in relatively opposite directions, clutches comprising coacting elements mounted upon the gear wheels and the shafts respectively, manually operable means for shifting said clutches in one direction or the other, a vertical manually operable shaft acting to clutch one or the other of the gear wheels to the shaft and having an axially projecting stop, a shaft rotated by the longitudinal movement of the screw-threaded shaft, a gear wheel driven by said rotatable shaft and stop carried by said gear wheel and engagable with the stop on the shaft and acting to rotate the vertical shaft in a direction to carry the shaft to its intermediate position upon a predetermined rotation of the screw-threaded shaft in either direction.

5. A power operated steering mechanism including a supporting frame, an interiorly screw-threaded shaft mounted thereon, a rod extending through the shaft and having threaded engagement therewith whereby as the shaft is rotated in either direction the rod will be shifted in one direction or the other, steering gear operatively connected to the rod to be shifted thereby, gear wheels mounted loosely upon the shaft, motor operated means for constantly driving said gear wheels in relatively opposite directions, clutches whereby either of said gear wheels may be connected for rotation with the shaft, means for operating said clutches including a manually operable shaft, and means acting automatically to return said manually operable shaft to a neutral position with the clutches thrown out when the screw-threaded shaft has made a predetermined rotation in either direction.

6. A power operated steering mechanism including a supporting frame, an interiorly screw-threaded shaft mounted thereon, a rod extending through the shaft and having threaded engagement therewith whereby as the shaft is rotated in either direction, the rod will be shifted in one direction or the other, steering gear operatively connected to the rod to be shifted thereby, gear wheels mounted loosely upon the shaft, motor operated means for constantly driving said gear wheels in relatively opposite directions, clutches whereby either of said gear wheels may be connected for rotation with the shaft, means for operating said clutches including a manually operable shaft, the shaft having an outwardly projecting stop, a shaft extending parallel to the manually operable shaft, a pinion thereon engaging said rod, the pinion being rotated when the rod is shifted longitudinally, a gear wheel mounted on the shaft carrying the pinion, a second gear wheel meshing therewith, and an arm carried by the second gear wheel and rotated from a neutral position into a position engaging the stop on the manually operable shaft and acting to rotate said shaft to its neutral position.

7. A motor operated steering mechanism including a longitudinally movable rod, steering gear operatively connected thereto, rotatable elements for driving engagement with the motor and driven in opposite directions thereby, which when actuated in opposite directions will shift the rod in one direction or the other, manually operable means for connecting said element to one or the other of the elements, said manually operable means being shiftable to a neutral position to disconnect said rotatable elements from the said actuating element, and means acting after a predetermined movement of the rod in either direction to automatically return the manually operable means to its intermediate position.

JOHN O'HARE.